US011977092B2

(12) United States Patent
Liu et al.

(10) Patent No.: US 11,977,092 B2
(45) Date of Patent: May 7, 2024

(54) QUANTITATIVE EVALUATION METHOD FOR ACTIVATION ENERGY OF PYROLYSIS OF GRADED DIESEL PARTICULATES

(71) Applicant: JIANGSU UNIVERSITY, Jiangsu (CN)

(72) Inventors: Junheng Liu, Zhenjiang (CN); Qian Ji, Zhenjiang (CN); Ping Sun, Zhenjiang (CN)

(73) Assignee: Jiangsu University, Jiangsu (CN)

( * ) Notice: Subject to any disclaimer, the term of this patent is extended or adjusted under 35 U.S.C. 154(b) by 715 days.

(21) Appl. No.: 17/265,326

(22) PCT Filed: Sep. 18, 2020

(86) PCT No.: PCT/CN2020/116085
§ 371 (c)(1),
(2) Date: Feb. 2, 2021

(87) PCT Pub. No.: WO2021/073351
PCT Pub. Date: Apr. 22, 2021

(65) Prior Publication Data
US 2022/0011208 A1    Jan. 13, 2022

(30) Foreign Application Priority Data
Oct. 18, 2019    (CN) .......................... 201910994237.9

(51) Int. Cl.
*G01N 5/04*    (2006.01)
*G01N 15/02*    (2024.01)

(52) U.S. Cl.
CPC ........... *G01N 5/04* (2013.01); *G01N 15/0272* (2013.01); *G01N 2015/0288* (2013.01)

(58) Field of Classification Search
CPC .............. G01N 5/04; G01N 15/0272; G01N 2015/0288
See application file for complete search history.

(56) References Cited

FOREIGN PATENT DOCUMENTS

| CN | 111312337 A | * | 6/2020 | |
|---|---|---|---|---|
| CN | 113188942 A | * | 7/2021 | ............... G01N 1/40 |

(Continued)

*Primary Examiner* — Mirellys Jagan
(74) *Attorney, Agent, or Firm* — Myers Bigel, P.A.

(57) ABSTRACT

A quantitative evaluation method for activation energy of pyrolysis of graded diesel particulates is disclosed, relating to the technical field of diesel particulate emission. The present disclosure includes four major steps: grading of particulates, pretreatment of the particulates, thermogravimetry test for the particulates in different particle size ranges, and mathematical analysis on obtained thermogravimetric data by using a Flynn-Wall-Ozawa (FWO) formula. The particulates are collected and treated by using a micro-orifice uniform deposit impactor and a thermogravimetric analyzer, to obtain thermogravimetry/differential thermogravimetry (TG/DTG) curves of the particulates in different particle size ranges, and final activation energy values of pyrolysis of the particulates in different particle size ranges are obtained by linear fitting of the obtained data. The present disclosure can quickly and accurately obtain oxidation activation energy of to-be-tested diesel particulates of different particle sizes, thereby providing effective parameters for regeneration design of a diesel particulate filter (DPF).

11 Claims, 3 Drawing Sheets

(56) References Cited

FOREIGN PATENT DOCUMENTS

CN 113405941 A * 9/2021
CN 115374662 A * 11/2022

* cited by examiner

QUANTITATIVE EVALUATION METHOD FOR ACTIVATION ENERGY OF PYROLYSIS OF GRADED DIESEL PARTICULATES

This application is a 35 U.S.C. § 371 national stage application of PCT International Application No. PCT/CN2020/116085, filed on Sep. 18, 2020, which claims priority to the Chinese Patent Application No. 201910994237.9, filed with the China National Intellectual Property Administration (CNIPA) on Oct. 18, 2019, and entitled "QUANTITATIVE EVALUATION METHOD FOR ACTIVATION ENERGY OF PYROLYSIS OF GRADED DIESEL PARTICULATES", and each above-identified application is incorporated herein by reference in its entirety.

TECHNICAL FIELD

The present disclosure relates to the technical field of diesel particulate emission, and in particular, to a quantitative evaluation method for activation energy of pyrolysis of graded diesel particulates.

BACKGROUND

Due to diffusion combustion, diesel engines generate high particulate emissions during practical working, causing serious hazards to the environment and human health. Therefore, treatment of diesel exhaust particulates has received widespread social attention. Diesel particulate filter (DPF) is an effective means to reduce particulate emissions, but it requires reliable periodic regeneration. Active regeneration of the DPF is an effective regeneration method, which includes fuel injection and combustion regeneration, electric heating regeneration, and other types of regeneration. Oxidation characteristics of particulates are important factors affecting the active regeneration process of the DPF. Therefore, it is critical to determine kinetic parameters of particulate oxidation for the study of active regeneration characteristics of the DPF.

At present, the thermal analysis of diesel particulates is mainly carried out on directly collected particulate agglomerates, while diesel exhaust particulates are composed of particulate groups of different particle sizes. Diesel exhaust particulates of different forms have different physical and chemical characteristics, such as different microstructures, morphologies, and compositions, thus affecting the overall thermodynamic characteristics of the particulates.

With the development of the diesel engine technology, higher requirements are imposed on the control over the number of particulates, and pyrolysis characteristics of small-size particulates mainly in a nuclear state and an accumulation state have become the focus of research. In particulates obtained by direct sampling using filter paper, fine particulates tend to agglomerate and become large particulates, causing a large gap between a direct test result and an actual situation of the DPF regeneration process. Therefore, to solve the deficiencies of the existing thermal analysis method for particulates, it is necessary to conduct graded sampling on particulates of different particle sizes and study thermogravimetric parameters and oxidation characteristics of particulates in different particle size ranges, to obtain kinetic characteristic parameters of particulates of different particle sizes, especially particulates of a small particle size, thereby determining energy required for active regeneration of the DPF, and providing technical guidance for the design of efficient active regeneration of the DPF.

SUMMARY

To solve the foregoing problem, the present disclosure provides a method for evaluating kinetic characteristics of pyrolysis of graded diesel particulates. The objective is to provide a method that can screen particulates in a particular particle size range from diesel exhaust particulates, remove soluble organic fraction (SOF), and then perform a thermogravimetric analysis test on the screened-out particulates, to obtain a reaction mechanism and corresponding kinetic parameters.

To implement the foregoing objective, the present disclosure provides a method for evaluating kinetic characteristics of pyrolysis of graded diesel particulates, including the following steps:

step 1: grading of particulates;
step 2: pretreatment of the particulates;
step 3: thermogravimetry test; and
step 4: calculation and analysis on a thermogravimetry test result by using a Flynn-Wall-Ozawa (FWO) method.

The graded sampling of the particulates is carried out using a micro-orifice uniform deposit impactor, which is mainly composed of a particle collector, a vacuum pump, a differential pressure gauge and a gas flow meter.

In a further preferred solution, linear calibration of a gas flow is performed according to a difference between an upper pressure and a lower pressure on the differential pressure gauge before formal sampling, and then a regulating valve on the differential pressure gauge is adjusted according to a working condition, so that an exhaust flow through the impactor is kept at about 30 L/min and a sampling time is kept at about 30 min, to obtain particulates in different particle size ranges.

The pretreatment of the particulates includes moisture removal and SOF removal; the focus of DPF regeneration is soot, because moisture and SOF are easy to evaporate in an actual working cycle and will not be deposited in the high-temperature particulate filter. In an actual test, SOF in the diesel particulates hinders a normal progress of a soot oxidation reaction, and is an interference item. After removal of the SOF, the thermogravimetry test of particulates can directly reflect kinetic characteristics of oxidative pyrolysis of the soot.

Further, the collected particulates of the particular particle size first needs to be placed in a drying oven to remove moisture, and then the SOF removal treatment is performed on the particulates by using a thermogravimetric instrument before testing. High-purity nitrogen is used as a protective gas, where a flow rate is 20 mL/min, a heating rate is 20° C./min, and a programmed heating range is 40° C. to 400° C.; high-purity nitrogen is also used as a reactant gas, where a flow rate is 50 mL/min. The temperature stays at 400° C. for 1 h to complete the SOF removal treatment.

The pyrolysis kinetic analysis test of the diesel exhaust particulates is carried out with a thermogravimetric analyzer, and the mass of soot used each time is 2 mg; high-purity nitrogen is used as a protective gas of a reaction system, and a flow rate of the protective gas is 20 mL/min; air is used as a working gas, and a flow rate of the working gas is 50 mL/min; a programmed heating range is 40° C. to 800° C., and the thermogravimetry test is performed at four heating rates of 10° C./min, 20° C./min, 30° C./min and 40° C./min respectively, to obtain corresponding thermogravimetry/differential thermogravimetry (TG/DTG) curves.

In the multi-scan-rate non-isothermal method (FWO method), it is unnecessary to make assumptions about reaction mechanism functions, and activation energy can be calculated directly, thus avoiding errors caused by different assumed mechanism functions. The FWO method is selected as the kinetic method for thermal analysis, and reaction activation energy parameters of the soot particulates can be obtained according to multiple thermogravimetry curves obtained at different heating rates.

A decomposition rate of soot particulates may be expressed as follows:

$$\frac{d\alpha}{dt} = kf(\alpha) \quad (1)$$

In the formula, $\alpha$ is a conversion rate (%), that is, a percentage of reactant-to-product conversion; k is an Arrhenius reaction rate constant, $f(\alpha)$ is a reaction mechanism function; t is a reaction time (s).

Further, it is assumed that the heating rate $\beta = dT/dt$, where the unit is K/min. After substitution into formula (1), it is obtained that:

$$\frac{d\alpha}{dT} = \left(\frac{1}{\beta}\right) kf(\alpha) \quad (2)$$

The reaction rate constant k may be expressed as follows:

$$k = A\exp\left(-\frac{E}{RT}\right) \quad (3)$$

In the formula, A is a pre-exponential factor ($\min^{-1}$), E is reaction activation energy (J/mol), T is a reaction temperature (K), and R is a molar gas constant, with a value of approximately 8.314 J/(mol~K).

Further, a kinetic equation under non-isothermal conditions is as follows:

$$\frac{d\alpha}{dT} = \left(\frac{A}{\beta}\right)\exp\left(-\frac{E}{RT}\right)f(\alpha) \quad (4)$$

Furthermore, after organizing of formula (4) and integration on both sides, it is obtained that:

$$G(\alpha) = \int_0^\alpha \frac{d\alpha}{f(\alpha)} = \frac{A}{\beta}\int_0^T \exp\left(-\frac{E}{RT}\right)dT \quad (5)$$

$G(\alpha)$ is an integral form of the dynamic mechanism function. As long as $\alpha$ is a fixed value, the value of $G(\alpha)$ does not change.

Further, after organizing of equation (5), the pyrolysis kinetic equation of the FWO method is as follows:

$$\ln\beta = \ln\frac{AE}{RG(\alpha)} - 5.3308 - 1.0516\frac{E}{RT} \quad (6)$$

Further, for different heating rates, if the conversion rate $\alpha$ is the same, the value of $G(\alpha)$ does not change. Formula (6) may be regarded as a first-order linear equation of $\ln\beta$ to $\frac{1}{T}$;

for thermogravimetry curves of different heating rates, by looking for points with the same conversion rate $\alpha$, a fitting straight line is drawn, and activation energy at this conversion rate can be obtained according to the slope of the straight line. The obtained activation energy is apparent activation energy of the oxidation reaction of the particulates of this particle size grade.

Diesel engines have different particle size distributions under different working conditions, where the average particle size and the number of particulates are small at low load; as the load increases, the particle size and the number of particulates increase. Therefore, energy required for active regeneration under different working conditions is different. No matter which regeneration method is used, highest thermal efficiency is achieved with appropriate regeneration energy. In the case of incorrect calculation of the heating energy, regeneration cannot be performed effectively if the heating energy is excessively small. On the contrary, if the heating energy is excessively high, it will burn a DPF carrier and cause a loss of thermal efficiency.

By performing graded sampling of the particulates and calculating activation energy of pyrolysis corresponding to particulates of different particle sizes, energy required for DPF regeneration under different working conditions can be accurately determined, thereby accurately controlling the active regeneration of the DPF.

According to the embodiments of the present disclosure, the present disclosure achieves the following technical effects:

1. The present disclosure provides a method for determining pyrolysis characteristics of particulates. Particulates generated during operation of a diesel engine are directly extracted from an exhaust pipe and sorted according to particle sizes. A thermogravimetry test is performed on the particulates of different particle sizes. Activation energy of pyrolysis of the particulates is calculated according to the test result by using an FWO formula.

2. This method can effectively eliminate test interference factors for particulates directly generated in a cylinder, to obtain high-accuracy activation energy parameters of diesel soot particulates of a particular particle size grade, thereby determining energy required for DPF regeneration, and providing an effective reference for accurately controlling the active regeneration process of the DPF.

3. After the particle size distribution of exhaust particulates and the activation energy of pyrolysis corresponding to particulates of different particle sizes are determined, energy required for DPF regeneration can be determined, and fuel injection or electric heating can be controlled, to achieve precise control of the DPF active regeneration.

4. The FWO method is used to obtain average apparent activation energy of pyrolysis of the diesel particulates in different particle size ranges, so as to effectively evaluate the pyrolysis characteristics of particulates of different particle sizes, and provide guidance for DPF active regeneration of the diesel engine.

5. The present disclosure can quickly and accurately obtain oxidation activation energy of to-be-tested diesel particulates of different particle sizes, thereby providing effective parameters for the DPF regeneration design.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are merely some rather than all of the embodiments of the present disclosure. All other embodiments obtained by a person of ordinary skill in the art based on the embodiments of the present disclosure without creative efforts shall fall within the protection scope of the present disclosure.

An objective of the present disclosure is to provide a method that can screen particulates in a particular particle size range from diesel exhaust particulates, remove SOF, and then perform a thermogravimetric analysis test on the screened-out particulates, to obtain a reaction mechanism and corresponding kinetic parameters.

In order to make the above objectives, features, and advantages of the present disclosure more understandable, the present disclosure will be described in further detail below with reference to the accompanying drawings and detailed embodiments.

Figure 1:
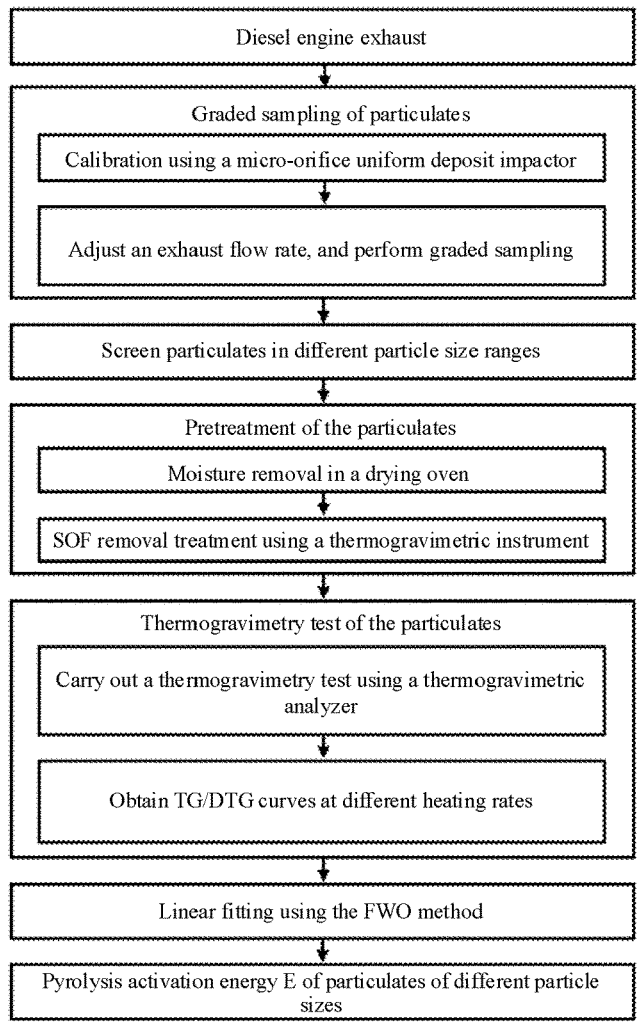
FIG. 1 is a flowchart of a method for evaluating kinetic characteristics of pyrolysis of graded particulates.

FIG. 1 is a flowchart of an embodiment of the present disclosure. The method specifically includes the following steps:

Step 1: graded sampling of particulates based on particle sizes.

To prevent a change in the working condition of the diesel engine from affecting a gas flow passing through a micro-orifice uniform deposit impactor, linear calibration of the gas flow needs to be performed according to a difference between an upper pressure and a lower pressure on a differential pressure gauge before a formal sampling test.

A 186FA diesel engine is selected as a test object, and standard diesel is used as fuel. During the sampling process, the diesel engine operates under a rated working condition, and the diesel exhaust containing particulates is pumped into a graded sampling pipeline at a constant volume flow rate of 30 L/min by using a vacuum pump. During the normal operation of the diesel engine, graded sampling is performed on the exhaust particulates, with a sampling time of 30 min. 8 pieces of aluminum foil filter paper are required for each sampling. Before formal sampling, the filter paper is taken out from a drying oven and weighed with a microgram precision balance. After sampling, the filter paper is taken out and placed back into the constant-temperature drying oven to balance the temperature and humidity for 8 hours before weighing. By calculating a mass difference of the filter paper used for each grade before and after sampling, the net weight of the particulates in each particle size range can be obtained, and a mass distribution law of diesel particulates in each particle size range can be obtained.

Figure 2:
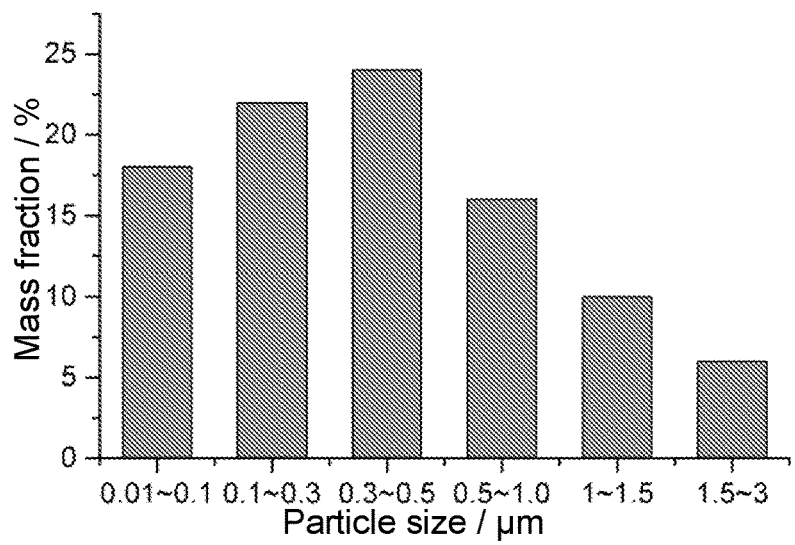
FIG. 2 shows a mass distribution of particulates of different particle sizes under a rated working condition of a diesel engine.

Under the rated working condition with a rotation speed of 3000 r/min and 100% load, the graded sampling is carried out, to obtain the particle size ranges of the particulates as follows: 0.01 to 0.1 μm, 0.1 to 0.3 μm, 0.3 to 0.5 μm, 0.5 to 1.0 μm, 1 to 1.5 μm and 1.5 to 3 μm. FIG. 2 shows a mass distribution of particulates of different particle sizes. It can be seen that the distribution peak of the exhaust particulates under this working condition is 0.3 to 0.5 μm, which corresponds to accumulated particulates. The mass fraction of nuclear particulates and accumulated particulates is significantly greater than that of coarse-filtered particulates. According to the particle size distribution under this working condition, it can be determined that the focus of DPF active regeneration under this working condition is the nuclear particulates and accumulated particulates.

Step 2: pretreatment of the particulates.

Particulates with particle sizes ranging from 0.01 to 0.1 μm, 0.3 to 0.5 μm, and 1 to 1.5 μm are selected, which are nuclear particulates, accumulated particulates, and coarse-filtered particulates respectively. The collected particulates of the three particle size ranges first need to be placed in a drying oven to remove moisture, and then SOF removal treatment is performed on the particulates by using a thermogravimetric instrument. High-purity nitrogen is used as a protective gas, where a flow rate is 20 mL/min, a heating rate is 20° C./min, and a programmed heating range is 40° C. to 400° C. High-purity nitrogen is also used as a reactant gas, where a flow rate is 50 mL/min. The temperature stays at 400° C. for 1 h to complete the SOF removal treatment.

Step 3: thermogravimetry test.

Figure 3:
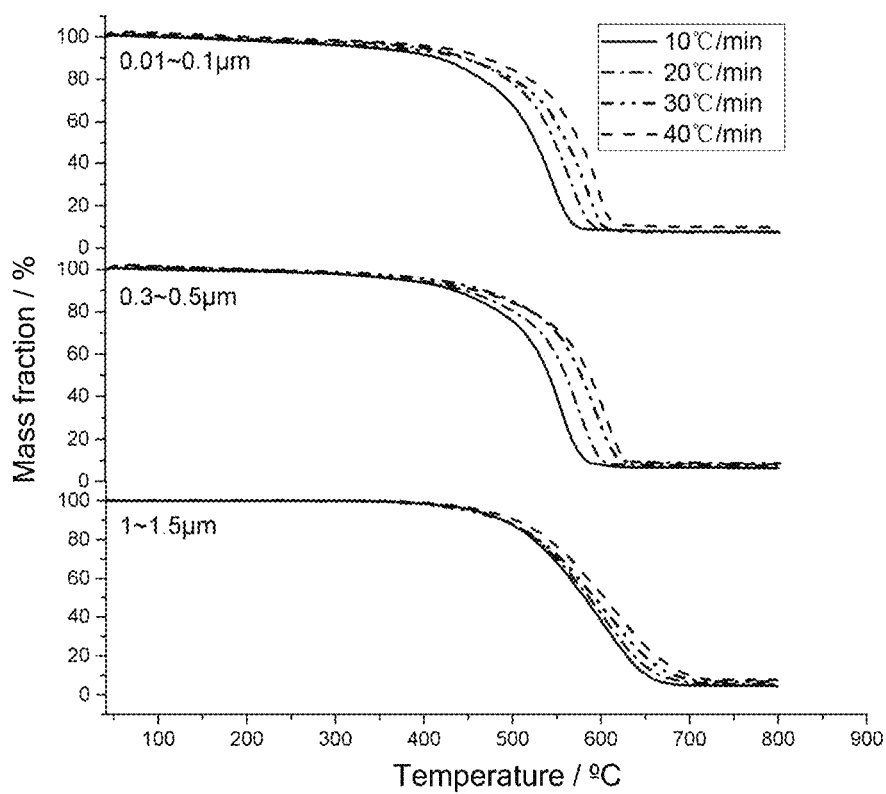
FIG. 3 shows TG curves of particulates in three particle size ranges.
Figure 4:
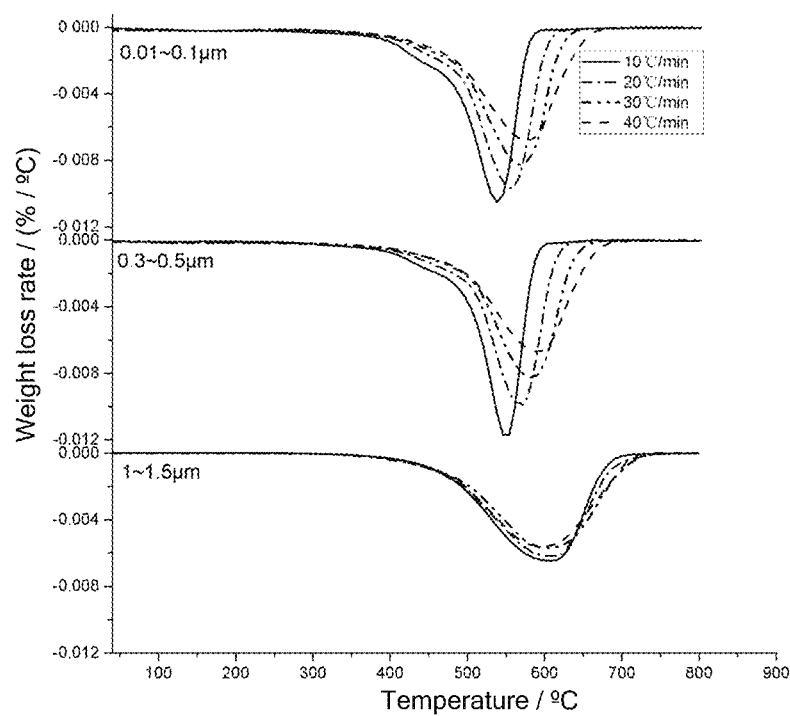
FIG. 4 shows DTG curves of particulates in three particle size ranges.

A thermogravimetric analyzer is used to perform thermogravimetry tests on the selected particulates of the three particle size ranges respectively. TG/DTG curves of the particulates at four heating rates of 10° C./min, 20° C./min, 30° C./min and 40° C./min are obtained. FIG. 3 and FIG. 4 show the TG curves and the DTG curves of the particulates in the three particle size ranges. It can be seen from the TG and DTG curves that for particulates of the same particle size, as the heating rate increases, oxidative pyrolysis of the particulates begins at a higher temperature. In addition, the temperature at the same pyrolysis conversion rate is higher, which conforms to the law in the FWO formula. As the particle size of the particulates increases, at the same heating rate, the temperature corresponding to the peak particle weight loss rate increases, and the temperature at the same conversion rate is also higher, indicating that as the particle size increases, activation energy required for pyrolysis of the particulates also increases. This is particularly evident in the coarse-filtered particulates.

Step 4: calculation of activation energy by using an FWO method.

For the pyrolysis kinetic equation of the FWO method, a set of T values with the same conversion rate α under different heating rates may be determined first, and then appropriate adjustments are made to convert the equation into a first-order linear equation.

Let $y = \ln\beta$, $x = 1/T \times 10^3$, $n = -1.10516\frac{E}{R}$, $b = \ln\frac{AE}{RG(\alpha)} - 5.3308$ Then, the pyrolysis kinetic equation of the FWO method can be expressed as a first-order linear equation y=nx+b, and the unit of E becomes kJ/mol. Thus, linear fitting straight lines of the particulates are obtained.

A point where the conversion rate α is 50% is selected for calculation. Table 1 shows relevant parameters required for the three types of particulates using the FWO method.

Figure 5:
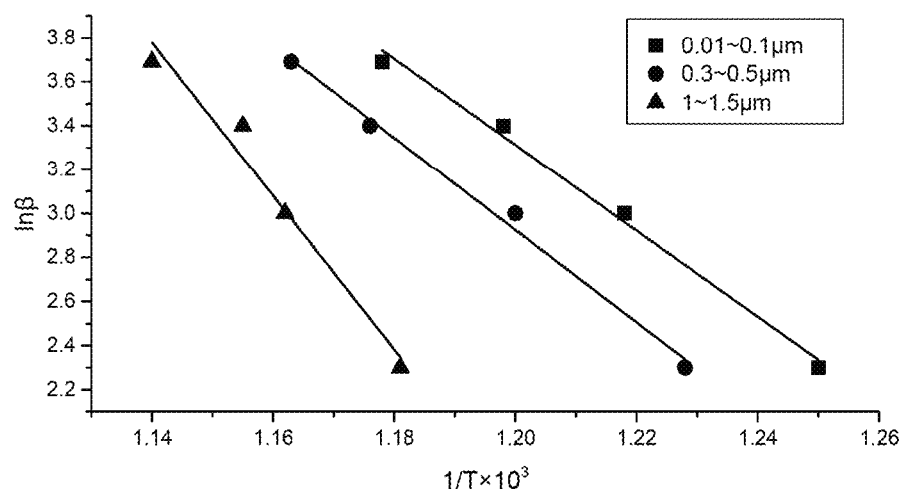
FIG. 5 shows FWO fitting curves of pyrolysis kinetics of the particulates.

According to the relevant parameters in Table 1, linear fitting curves of particulates in different particle size ranges can be made. Based on the slopes n of the fitting curves, activation energy values of the oxidation reaction of the particulates in different particle size ranges can be calculated. FIG. 5 shows the fitting curves of particulates in different particle size ranges. It can be seen that the fitting curves of particulates of different particle sizes have different slopes, and a fitting curve corresponding to a larger particle size has a greater slope.

TABLE 1

Relevant Parameters Required for FWO Method

| Particle size range | β(K/min) | T/K | 1/T × 10³ | lnβ |
|---|---|---|---|---|
| 0.01 to 0.1 μm | 10 | 799.8 | 1.250 | 2.30 |
| | 20 | 821.3 | 1.2118 | 3.00 |
| | 30 | 834.5 | 1.198 | 3.40 |
| | 40 | 848.6 | 1.178 | 3.69 |
| 0.3 to 0.5 μm | 10 | 814.5 | 1.228 | 2.30 |
| | 20 | 833.2 | 1.200 | 3.00 |
| | 30 | 850.4 | 1.176 | 3.40 |
| | 40 | 859.7 | 1.163 | 3.69 |
| 1 to 1.5 μm | 10 | 846.7 | 1.181 | 2.30 |
| | 20 | 860.8 | 1.162 | 3.00 |
| | 30 | 865.7 | 1.155 | 3.40 |
| | 40 | 877.1 | 1.140 | 3.69 |

Table 2 shows fitting equations of fitting straight lines of particulates in different particle size ranges and calculated activation energy values E. The value of the oxidation activation energy of the nuclear particulates with the particle size of 0.01 to 0.1 μm is 147.001 kJ/mol, the value of the oxidation activation energy of the accumulated particulates with the particle size of 0.3 to 0.5 μm is 157.755 kJ/mol, and the value of the oxidation activation energy of the coarse-filtered particulates with the particle size of 1 to 1.5 μm is 262.323 kJ/mol. The linear regression coefficients of fitting for the three types of particulates are 0.9891, 0.9890 and 0.9713 respectively.

The results in Table 2 show that the linear fitting lines, obtained with the pyrolysis kinetic equation of the FWO method, of the particulate samples in different particle size ranges achieve a good linear regression coefficient $R^2$, and the fitting results are ideal. Through calculation using this method, it is obtained that the oxidation activation energy E of the particulates in the particle size ranges of 0.01 to 0.1 μm, 0.3 to 0.5 μm, and 1 to 1.5 μm are: 147.001 kJ/mol, 157.755 kJ/mol and 262.323 kJ/mol, respectively. It can be seen that as the particle size of the particulates increases, the oxidation activation energy of the particulates also increases.

After the particle size distribution of the particulates and the activation energy of the particulates of different particle sizes are determined, the energy required for DPF active regeneration can be determined according to the main particle size range under the working condition and the obtained activation energy value, thereby accurately controlling DPF active regeneration, and achieving efficient regeneration.

In the present disclosure, based on the characteristics of a wide particle size distribution of the diesel exhaust particulates, a micro-orifice uniform deposit impactor is adopted to complete particle size differentiation and collection of various mixed-size particulates discharged during practical working of the diesel engine. Then, thermogravimetry curves of the particulates are measured by using a measuring device of a thermogravimetric analyzer. Calculation is performed on thermogravimetry test results by using a pyrolysis kinetic formula of the FWO method, to obtain the oxidation activation energy E corresponding to the particulates in different particle size ranges. The present disclosure can quickly and accurately obtain the oxidation activation energy of to-be-tested particulates of different particle sizes, thereby determining the energy required for DPF regeneration, and providing effective parameters for the active regeneration design of the DPF.

TABLE 2

Characteristic Parameters of Three Types of Particulates Calculated with FWO Method

| Particle size range/μm | Fitting equation | $R^2$ | n | E(kJ/mol) |
|---|---|---|---|---|
| 0.01 to 0.1 | $y_1 = -19.54x_1 + 26.765$ | 0.9891 | −19.54 | 147.001 |
| 0.3 to 0.5 | $y_2 = -20.97x_2 + 28.086$ | 0.9890 | −20.97 | 157.755 |
| 1 to 1.5 | $y_3 = -34.87x_3 + 43.53$ | 0.9713 | −34.87 | 262.323 |

Each embodiment of the present specification is described in a progressive manner, each embodiment focuses on the difference from other embodiments, and for the same and similar parts between the embodiments, reference may be made to each other.

In this specification, several specific embodiments are used for illustration of the principles and implementations of the present disclosure. The description of the foregoing embodiments is used to help illustrate the method of the present disclosure and the core ideas thereof. In addition, a person of ordinary skill in the art can make various modifications in terms of specific implementations and scope of application in accordance with the ideas of the present disclosure. In conclusion, the content of the present specification shall not be construed as a limitation to the present disclosure.

What is claimed is:

1. A method for evaluating activation energy of pyrolysis of graded diesel particulates, the method comprising:
    performing graded sampling on diesel exhaust particulates, resulting in particulates of different particle size ranges;
    performing a moisture removal and soluble organic fraction (SOF) removal treatment on the particulates of different particle size ranges;
    performing a thermogravimetry test on the particulates of different particle size ranges subsequent to the moisture removal and SOF removal treatment, resulting in thermogravimetry/differential thermogravimetry (TG/DTG) curves for different heating rates and different particle size ranges of the particulates; and
    calculating an activation energy E of pyrolysis of the particulates in different particle size ranges by using a Flynn-Wall-Ozawa (FWO) method based on the TG/DTG curves.

2. The method for evaluating activation energy of pyrolysis of graded diesel particulates according to claim 1, wherein performing the graded sampling comprises:

performing graded sampling on the diesel exhaust particulates by using a micro-orifice uniform deposit impactor to screen particulates in different particle size ranges.

3. The method for evaluating activation energy of pyrolysis of graded diesel particulates according to claim 1, wherein a heating range is 40° C. to 800° C., and the thermogravimetry test is performed at a heating rate of 10° C/min, 20° C/min, 30° C/min or 40° C/min to obtain the TG/DTG curves, and wherein the TG/DTG curves correspond to different particle size ranges.

4. The method for evaluating activation energy of pyrolysis of graded diesel particulates according to claim 1, wherein performing the moisture removal and SOF removal treatment comprises first placing collected particulates in different particle size ranges in a drying oven to remove moisture, and then performing the SOF removal treatment on the particulates by using a thermogravimetric instrument before performing the thermogravimetry test.

5. The method for evaluating activation energy of pyrolysis of graded diesel particulates according to claim 4, wherein performing the SOF removal treatment on the particulates by using the thermogravimetric instrument comprises: using high-purity nitrogen as a protective gas, with a flow rate of 20 mL/min, a heating rate of 20° C/min, and a programmed heating range of 40° C. to 400° C.; using high-purity nitrogen as a reactant gas, with a flow rate of 50 mL/min; and staying at 400° C. for 1 h to complete the SOF removal treatment.

6. The method for evaluating activation energy of pyrolysis of graded diesel particulates according to claim 1, wherein performing the moisture removal and SOF removal treatment comprises performing a treatment of removing moisture and SOF from the particulates.

7. The method for evaluating activation energy of pyrolysis of graded diesel particulates according to claim 6, wherein performing the moisture removal and SOF removal treatment comprises first placing collected particulates in different particle size ranges in a drying oven to remove moisture, and then performing the SOF removal treatment on the particulates by using a thermogravimetric instrument before performing the thermogravimetry test.

8. The method for evaluating activation energy of pyrolysis of graded diesel particulates according to claim 7, wherein performing the SOF removal treatment on the particulates by using the thermogravimetric instrument comprises: using high-purity nitrogen as a protective gas, with a flow rate of 20 mL/min, a heating rate of 20° C/min, and a programmed heating range of 40° C. to 400° C.; using high-purity nitrogen as a reactant gas, with a flow rate of 50 mL/min; and staying at 400° C. for 1 h to complete the SOF removal treatment.

9. The method for evaluating activation energy of pyrolysis of graded diesel particulates according to claim 1, wherein particulates in different particle size ranges are separately placed into a thermogravimetric analyzer for the thermogravimetry test.

10. The method for evaluating activation energy of pyrolysis of graded diesel particulates according to claim 9, wherein a mass of soot used for the thermogravimetry test each time is 2 mg; wherein high-purity nitrogen is used as a protective gas of a reaction system, and a flow rate of the protective gas is 20 mL/min; and wherein air is used as a working gas, and a flow rate of the working gas is 50 mL/min.

11. The method for evaluating activation energy of pyrolysis of graded diesel particulates according to claim 10, wherein a heating range is 40° C. to 800° C., and the thermogravimetry test is performed at a heating rate of 10° C/min, 20° C/min, 30° C/min or 40° C/min to obtain the TG/DTG curves, and wherein the TG/DTG curves correspond to different particle size ranges.

* * * * *